(12) United States Patent
Fame (10) Patent No.: US 8,034,298 B2
(45) Date of Patent: Oct. 11, 2011

(54) FLUID BED REACTORS AND ASSOCIATED METHODS

(75) Inventor: David Fame, Neshanic Station, NJ (US)

(73) Assignee: Brunob II B.V., Arnhem (NL)

( * ) Notice: Subject to any disclaimer, the term of this patent is extended or adjusted under 35 U.S.C. 154(b) by 245 days.

(21) Appl. No.: 12/437,190

(22) Filed: May 7, 2009

(65) Prior Publication Data

US 2010/0034709 A1 Feb. 11, 2010

Related U.S. Application Data

(60) Provisional application No. 61/087,434, filed on Aug. 8, 2008.

(51) Int. Cl.
*B01J 8/18* (2006.01)

(52) U.S. Cl. ........ 422/141; 422/139; 422/145; 210/683; 210/688; 210/912

(58) Field of Classification Search .................. 422/139, 422/141, 145; 210/683, 688, 912
See application file for complete search history.

(56) References Cited

U.S. PATENT DOCUMENTS

| | | | |
|---|---|---|---|
| 2,893,851 A | | 7/1959 | Georgian |
| 3,287,823 A | * | 11/1966 | Vidali .............................. 34/173 |
| 4,236,063 A | * | 11/1980 | Glucksman ................... 219/400 |
| 4,612,183 A | | 9/1986 | Kim et al. |
| 4,769,923 A | | 9/1988 | Chang |
| 4,839,022 A | * | 6/1989 | Skinner .......................... 208/13 |
| 5,329,020 A | * | 7/1994 | Kalota et al. .................. 548/520 |
| 5,602,071 A | * | 2/1997 | Summers et al. ............. 502/401 |
| 5,720,822 A | | 2/1998 | Jeffcoat et al. |
| 5,725,676 A | | 3/1998 | Chiu et al. |
| 5,910,240 A | | 6/1999 | Senior et al. |
| 5,932,017 A | | 8/1999 | Chiu et al. |
| 6,010,574 A | | 1/2000 | Jeffcoat et al. |
| 6,231,675 B1 | | 5/2001 | Chiu et al. |
| 6,261,376 B1 | | 7/2001 | Jeffcoat et al. |
| 6,395,678 B1 | * | 5/2002 | Summers et al. ............. 502/416 |

(Continued)

FOREIGN PATENT DOCUMENTS

DE 1149336 B 5/1963

(Continued)

OTHER PUBLICATIONS

European Search Report for application No. EP 09 01 0196 daetd Oct. 20, 2009.

(Continued)

*Primary Examiner* — Walter Griffin
*Assistant Examiner* — Huy-Tram Nguyen
(74) *Attorney, Agent, or Firm* — Greenberg Traurig, LLP (57) ABSTRACT

In one embodiment of the present invention a fluid bed reactor is provided, comprising:
a housing, at least one tray disposed within the housing, at least one motor operatively connected to the at least one tray, wherein the motor rotates the at least one tray; and at least one wiper associated with at the at least one tray which directs product on a top surface of a respective tray down through at least one radial slot in each respective tray as each respective tray is rotated by the motor. At least one of the trays is at least partially perforated material which a gas to flow up out of the top surface of the tray, at least partially fluidizing product on the top surface of the tray.

23 Claims, 5 Drawing Sheets

U.S. PATENT DOCUMENTS

| | | | |
|---|---|---|---|
| 6,451,121 B2 | 9/2002 | Chiu et al. | |
| 6,609,871 B2 | 8/2003 | Pfeiffer et al. | |
| 6,682,290 B2 | 1/2004 | Pfeiffer et al. | |
| 6,719,500 B2 | 4/2004 | Pfeiffer et al. | |
| 6,722,822 B2 | 4/2004 | Pfeiffer et al. | |
| 6,843,922 B1 * | 1/2005 | Summers et al. | 210/683 |
| 2006/0163118 A1 | 7/2006 | Kelsey et al. | |
| 2006/0222752 A1 * | 10/2006 | Furtaw | 426/641 |
| 2007/0003677 A1 * | 1/2007 | Martorell | 426/534 |
| 2007/0238839 A1 | 10/2007 | de Broqueville | |
| 2007/0270557 A1 | 11/2007 | Dooley | |

FOREIGN PATENT DOCUMENTS

| | | |
|---|---|---|
| DE | 2551578 A1 | 5/1977 |
| DE | 3828941 A1 | 3/1990 |
| EP | 0449398 A | 10/1991 |
| WO | W094/22764 A | 10/1994 |

OTHER PUBLICATIONS

Ventilex; "Fluid Bed Thermal Physical Process Technology".

Martin Kurz & Company, Inc.—Dynapore® Products; Dynapore® Porous Metal Products http://www.mkicorp.com/products.asp.

Martin Kurz & Company, Inc.—Dynapore® Applications; Dynapore®—A World of Possibilities http://www.mkicorp.com/apps.asp.

Martin Kurz & Company, Inc.—Overview—Composite Dynapore® Structures http://www.mkicorp.com/o-compstruct.asp.

Martin Kurz & Company, Inc.—Porous Metals Overview http://www.mkicorp.com/overview.asp.

Martin Kurz & Company, Inc.—Overview—Woven Wire Mesh http://www.mkicorp.com/o-wiremesh.asp.

Martin Kurz & Company, Inc.—Overview—Sintered Wire Mesh Laminates http://www.mkicorp.com/o-meshlam.asp.

Wyssmont—Provider of rotating tray dryers, countercurrents, solvent dryers, multistages, laboratories and calciners; Turbo-Dryer® Product Information http://www.wyssmont.com/pdryer.html.

Wyssmont—Provider of rotating tray dryers, countercurrents, solvent dryers, multistages, laboratories and calciners; Request More Information http://www.wyssmont.com/requests.html.

Young Industries SilentFlow Bin Discharger; Copyright © 1997-2008—All Rights Reserved Young Industries, Inc. http://www.younginds.com/WebPages/BinDischargers/SilentFlow/Silentflow.htm.

The Young Industries, Inc.; Bulletin 265-202-0; "How to get difficult-to-handle powders to flow our of your silos, bins and hoppers."

The Young Industries, Inc.: Product Specification Sheet No. 265-401-1: Trans-Flow® Aeration Products; "Trans-Flow® Bin Dischargers make your difficult bulk materials flow reliably out of bins, hoppers and silos" © Copyright The Young Industries, Inc. 2000-2001.

The Young Industries, Inc.: Product Specification Sheet No. 265-403-1: Trans-Flow® Aeration Products; "Trans-Flow® Transitions and Downspouts solves material flow problems" © Copyright The Young Industries, Inc. 2000-2001.

The Young Industries, Inc.: Product Specification Sheet No. 265-402-1: Trans-Flow® Aeration Products; "Trans-Flow® Aeration Pads are a new generation of aeration pads that promotes reliable material flow." © Copyright The Young Industries, Inc. 2000-2001.

The Young Industries, Inc.; Bulletin 265-200-1; Trans-Flow® Aeration Products © Copyright The Young Industries, Inc. 2000-2001.

Young Industries, Inc.: Listing of Equipment Engineered and Manufactured by Young Industries, Inc.; Stinger Metering Feeder; Nov. 26, 2007 http://www.younginds.com/stinger.html.

* cited by examiner

Starch 1 - NOVATION® 2300 Starch

Starch 2 - NOVATION® 2600 Starch

Example 4b - run at 0.9 cfm/sq ft

Example 4a - run at 2.7 cfm/sq ft pH adj WCS - waxy corn starch at pH 9.5 prior to experiment

FLUID BED REACTORS AND ASSOCIATED METHODS

RELATED APPLICATIONS

This application claims the benefit of U.S. Provisional Application Ser. No. 61/087,434, filed Aug. 8, 2008. The aforementioned application is incorporated herein by reference in its entirety.

FIELD OF THE INVENTION

One embodiment of the present invention relates to a fluid bed reactor.

Another embodiment of the present invention relates to a fluid bed reactor for drying product input therein.

Another embodiment of the present invention relates to an associated method for drying product.

For the purposes of describing and claiming the present invention, the term "perforated material" is intended to refer to any material having holes or the like through which a gas may flow (including, but not limited to meshes (e.g., metal meshes), weaves (e.g., metal weaves), fibers (e.g., metal fibers), etched foils (e.g., photo-etched metal foils), gas-porous materials and/or gas-permeable materials).

Further, for the purposes of describing and claiming the present invention, the term "at least partially fluidizes" is intended to refer to directing a flow of gas out of a top surface of a tray such that product on the top surface of the tray at least partially behaves like a fluid but such that the product still at least partially rotates with the tray as the tray is rotated.

BACKGROUND OF THE INVENTION

Thermally-inhibited starches and flours (as well as processes for their preparation) are well-known in the art and described, for example, in U.S. Pat. Nos. 5,720,822; 5,725,676; 5,932,017; 6,010,574; 6,231,675; 6,261,376; and 6,451,121, all incorporated herein by reference in their entirety for all purposes.

Martin Kurz & Co., Inc., of Mineola, N.Y., USA, markets the so-called DYNAPORE sintered porous metals which may be divided into classes determined by the raw materials employed, as follows: sintered woven wire mesh (single layer); sintered wire mesh laminates (multi-layer); and composite structures. Of note, in one embodiment, DYNAPORE (or a similar material) may be utilized in a device and/or method according to the present invention (e.g., as the perforated material of one or more of the trays).

Young Industries, of Muncy, Pa., USA, markets the so-called SILENTFLOW bin discharger product. Of note, in one embodiment, TRANS-FLOW aeration media (or a similar material) may be utilized in a device and/or method according to the present invention (e.g., as the perforated material of one or more of the trays).

Wyssmont, of Fort Lee, N.J., USA, markets the so-called TURBO-DRYER product. Of note, in one embodiment, a dryer similar in configuration to the TURBO-DRYER (e.g., having vertically spaced rotating trays) may be utilized in a device and/or method according to the present invention.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Figure 1:
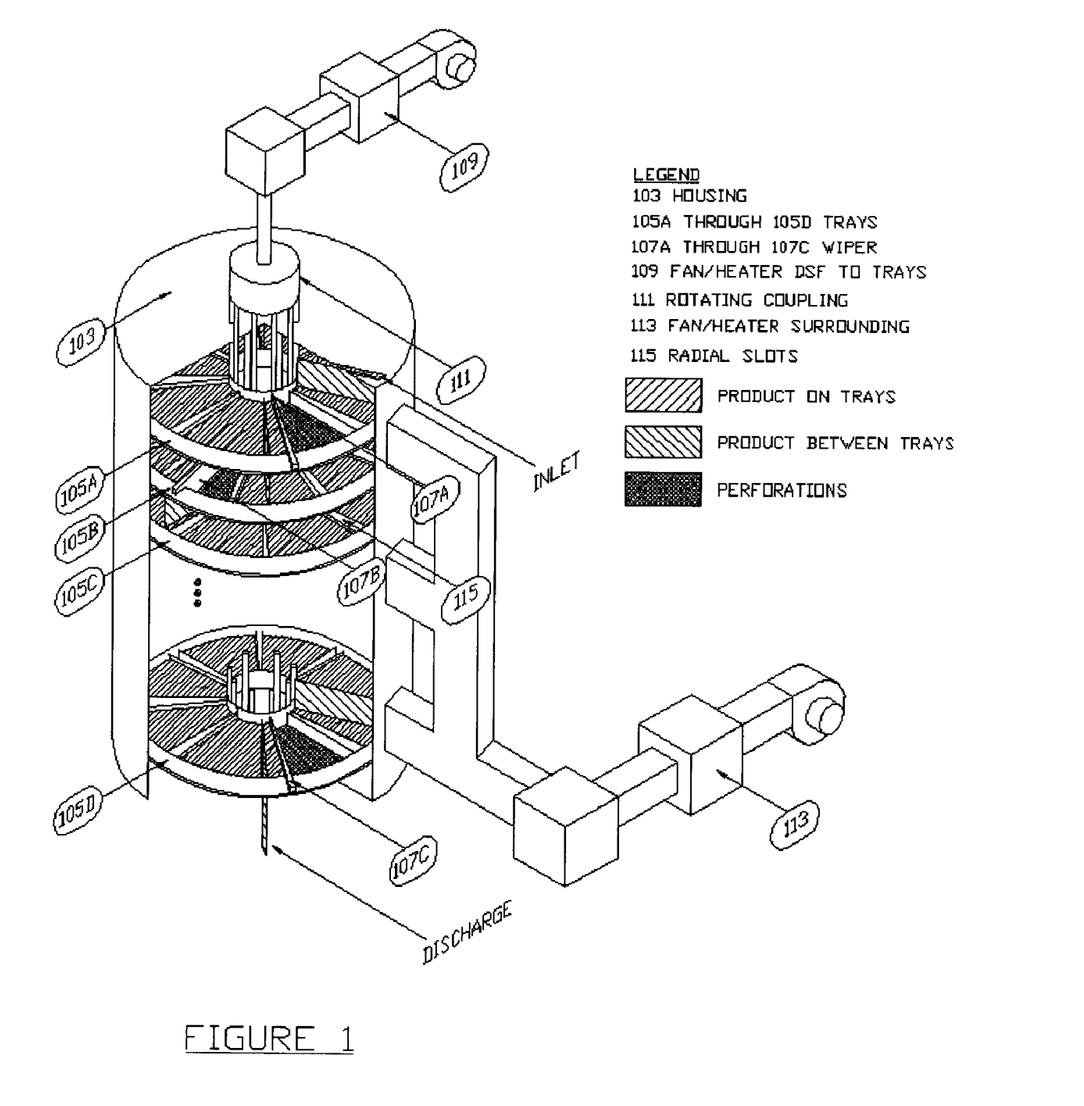
FIG. 1 shows a partially cut away view of a fluid bed reactor according to an embodiment of the present invention.

Referring now to FIG. 1 (a partially cut away view), a fluid bed reactor 101 according to an embodiment of the present invention is shown. The fluid bed reactor 101 of this embodiment may comprise a housing 103 (shown here partially cut away) and at least one tray 105A-105D (of note, while four trays are shown in the Figure (and called-out with reference numerals), any number of trays (more trays or less trays) may, of course, be utilized—this is indicated by the three ellipses between tray 105C and tray 105D).

As seen, in this embodiment the at least one tray 105A-105D is disposed within the housing 103. In one embodiment, there is a plurality of trays and in the shown embodiment the plurality of trays 105A-105D are spaced vertically apart from one another.

Further, at least one motor (not shown) may be operatively connected to the at least one tray 105A-105D to rotate the at least one tray 105A-105D.

In addition, at least one wiper may be provided (of note, while three wipers 107A-107C are called-out with reference numerals, any desired number of wipers (e.g., one wiper per tray, a plurality of wipers per tray) may, of course, be utilized; of further note, no wiper is shown in this view for tray 105C, because in this illustrative view the wiper would be hidden from view at the back of the housing 103, as the wipers may be at any radial position on the tray, either in the same position on each tray or in a different position from tray to tray). Each wiper may direct product on a top surface of a respective tray down through at least one radial slot in each respective tray as each respective tray is rotated by the motor (of note, while one radial slot 115 is called-out with a reference numeral, any desired number of radial slots (e.g., one slot per tray, a plurality of slots per tray) may, of course, be utilized). While the wipers may be at any radial position, in one embodiment they are progressively oriented such that the product will may a substantially complete rotation on a tray prior to being directed through the radial slot. The wiper may also contribute, along with the fluidization, to the leveling and movement of the product.

Further, the at least one of the trays comprises a perforated material. In one example, one tray may comprises a perforated material. In another example, all of the trays may comprise a perforated material. In another example, less than all of the trays may comprise a perforated material. In another example, the perforated material may comprise less than the entire surface of a tray. In another example, the perforated material may comprise essentially the entire surface of a tray. Of note, in the view of FIG. 1 a perforated material comprises essentially the entire bottom surface of each tray, although only a portion of each perforated material is seen in this view (as a dark wedge) because product is depicted on top of each perforated material).

Further, each tray may have a raised lip or wall to retain the product on the tray. The lip or wall may be any height, but in one embodiment is the same height as the top of the wiper.

The perforated material may permit a gas (e.g., heated dry supply fluid ("DSF")) to flow up out of the top surface of a tray and the flow of gas out of the top surface of the tray may at least partially fluidize product on the top surface of the tray.

In one example, heated DSF may be provided by fan/heater 109 via rotating DSF coupling 111 (additional heating may be provided by secondary fan/heater 113, if desired).

In another example, at least one heater may heat at least the housing (e.g., the exterior and/or the interior).

In another example, at least one heater may heat at least some of the gas flowing up out of the top surface of the tray(s).

In another example, a single motor may be utilized.

In another example, a plurality of motors may be utilized.

In another example, at least one of the wipers may be a stationary wiper.

In another example, each of the wipers may be a stationary wiper.

In another example, the perforated material may be sized to essentially prohibit product from passing through the perforations.

In another example, the size of the perforations may be the same for each of the at least one tray.

In another example in which there is a plurality of trays, the size of the perforations may be different for at least two of the trays.

In another example, the perforations on a tray may all be of the same size.

In another example, the perforations on a tray may be of different sizes.

In another example, the gas may comprise air, dried gas, oxygen-enriched air, an inert gas, including in one embodiment nitrogen, steam (including in one embodiment superheated steam), and/or any combination thereof.

In another example, the fluid bed reactor may further comprise at least one fan, wherein the gas may be caused to flow up out of the top surface of the tray by the fan.

In another example, the fluid bed reactor may further comprise at least one heater.

In another example, the heater may heat at least some of the gas flowing up out of the top surface of the tray.

In another example, the heater may heat all of the gas flowing up out of the top surface of the tray.

In another example in which there is a plurality of trays, the trays may be spaced vertically apart from one another along a common axis of rotation.

In another example in which there is a plurality of trays, the vertical spacing between each of the plurality of trays may be the same for each of the plurality of trays.

In another example in which there is a plurality of trays, the vertical spacing between each of the plurality of trays may be different for at least two of the plurality of trays.

In another example, each of the at least one tray may be essentially circular.

In another example, the top surface of each of the at least one tray may be essentially planar.

In another example, the speed of rotation of each of the at least one tray may be the same.

In another example in which there is a plurality of trays, the speed of rotation of at least two of the trays may be different.

In another example, each of the at least one tray may have a single radial slot.

In another example, each of the at least one tray may have a plurality of radial slots.

In another example, each of the plurality of trays have the same number of slots and in another example in which there is a plurality of trays, at least two of the trays may have a different number of slots.

In another example in which there is a plurality of radial slots, the spacing between the radial slots on the at least one tray may be the same.

In another example in which there is a plurality of radial slots, the spacing between the radial slots on at least one tray may be different.

In another example, the fluid bed reactor may further comprise at least one leveler, wherein each leveler may be associated with one of the at least one tray, and wherein each of the at least one leveler may maintain product on a top surface of a respective tray at a predetermined level.

In another example, the predetermined level may be the same for each of the at least one leveler.

In another example in which there is a plurality of levelers, the predetermined level may be different for at least two of the levelers.

In another example, the at least one leveler may be a stationary leveler.

In another example in which there is more than one leveler, each of the levelers may be a stationary leveler.

In another example, each of the at least one tray may be disposed entirely within the housing.

In another example, the perforated material perforation/mesh size may have a range of: 0.2 micron-1000 microns; 5 microns-500 microns; 25 microns-250 microns; or 1 micron-20 microns.

In another example, the gas flow velocity may have a range of (may vary based on the size of the unit): 0.1 feet per hour-3,000 feet per hour; 40 feet per hour-300 feet per hour; 1200 feet per hour-2400 feet per hour; 100 feet per hour-1,000 feet per hour; 25 feet per hour-500 feet per hour; or 1,000 feet per hour-3,000 feet per hour.

In another example, the product bed thickness may have a range of: ½"-10"; 1.5"-3"; or 1"-5".

In another example, the average product particle size may have a range of: 0.1 micron-1000 microns; 1 micron-250 microns; 25 microns-100 microns; 0.1 microns-25 microns; or <10 microns.

In another example, the tray diameter may have a range of: 0.5'-50'; 5'-40'; 10'-20'; or 15'-25'.

Figure 2:
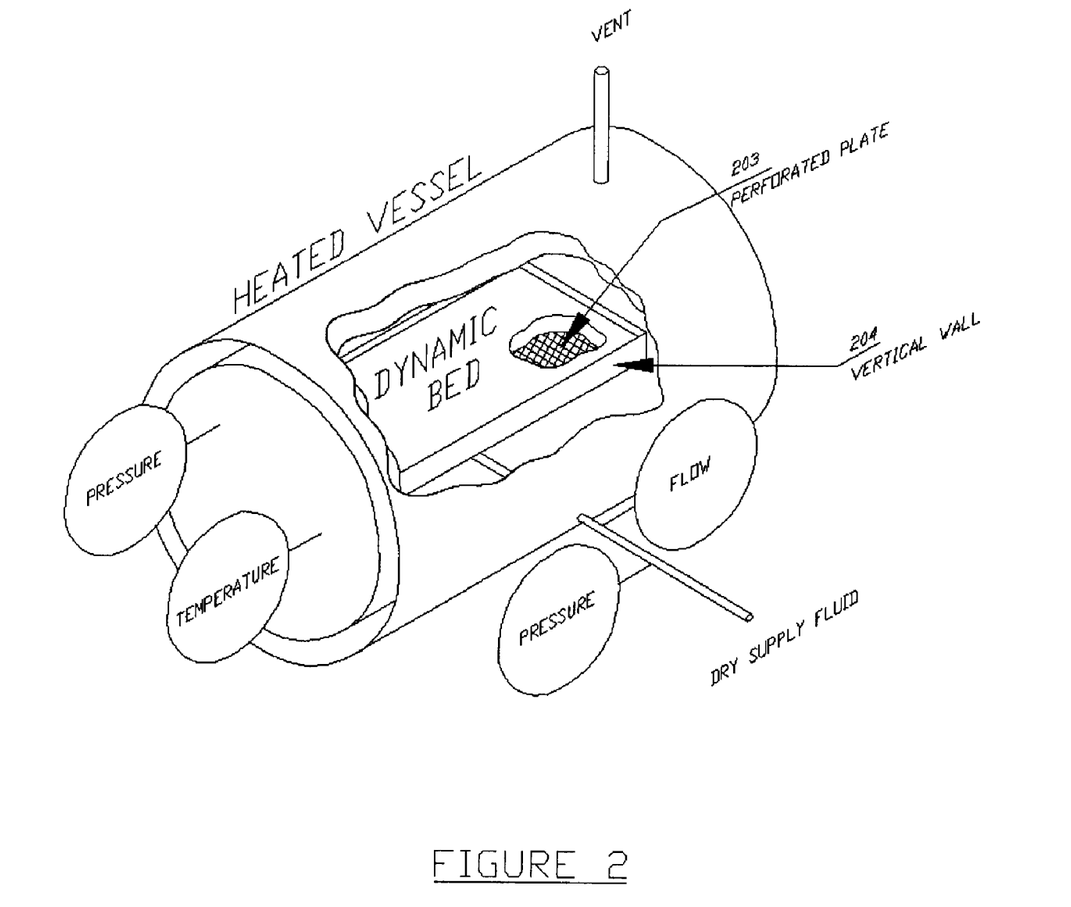
FIG. 2 shows a view of a fluid bed reactor proof of concept device according to an embodiment of the present invention.

Referring now to FIG. 2, a view of a fluid bed reactor proof of concept device 201 according to an embodiment of the present invention is shown. As seen in this FIG., a TRANSFLOW plate 203 measuring approximately 12"×18" was used with a 2' vertical wall 204 on the outside edge. The TRANSFLOW plate 203 was installed in a heated vessel and supplied with a DSF, in this case an instrument air/nitrogen blend (of note, the fluid bed reactor proof of concept device 201 is partially cut away in this view (showing the interior with product on a perforated plate)). The flows, temperatures and pressures were monitored through the various experimental runs.

In this regard, several experiments were conducted regarding how the powder moves on the plate with respect to the DSF, and what would occur when heated. The work was done using the perforated plate and waxy corn starch at an initial moisture of 9.5%. One intent of the experiments was to determine the minimum quantity of DSF required in order to produce a suspended product bed. Of note, all examples, test runs, experiments and the like described herein are intended to be illustrative and not restrictive.

With respect to determination of moisture when 1% or less, the following procedure was carried out—Five grams of powder was weighed onto a Cenco B-3 Digital moisture balance. The bulb power was set to 100% to heat the sample to between 135-140° C. for 15 minutes. Weight percent moisture was determined by weight loss and reported directly by the moisture balance. Note, if moisture was above 1% moisture, the balance was run in automatic and stopped when there was no change in weight of the sample.

Further, the DSF for the test runs was a mixture of nitrogen and compressed air. The liquid nitrogen was expanded to the gaseous state and contained less than 20 ppm oxygen and less than 18 ppm water from the assay supplied from the vendor. The compressed air was dried using a refrigerated drier and desiccant drier. The mixture used for the experiments was 62.5% nitrogen and 37.5% air by volume using rotometers.

There were Several Unheated Trials as Follows:

Examples 1a and 1b: Approximately 2 pounds of waxy corn starch was added to the test plate and evenly distributed across the plate using a straight edge. The compressed air used as the DSF was regulated between 10 and 20" WC. The DSF was supplied at 2 and 4 ft$^3$/min pressure to the unit. In both cases, the product bed raised and cracked in the center, which allowed flow only through the cracks formed in the product bed. It was concluded that the method of distribution used packed the starch, and did not allow the DSF to flow uniformly through the product bed and between the particles.

Example 2: A second test was conducted with the DSF flowing prior to the waxy corn starch being added at the same flow rates used in the first set of experiments (1a and 1b). After addition of the starch, the starch was not touched. During this experiment, the loading weights were increased up to 4½ pounds. Using varying weights, the heights of the product bed varied from ¼" up to 1½" high. The starch during these runs no longer packed when added, but flowed like a fluid, and leveled to the heights indicated above without additional interaction. Another visual observation was the surface did not appear to be moving like a traditional fluid bed which particles move from bottom to top and are in constant motion.

Examples 3a and 3b: The third experiment outside the heated vessel was done to understand how the proof of concept device was fluidizing the starch. Keeping the DSF on from the start of the test the following was done. Waxy corn starch dyed red was added to the test plate for two tests (1) at the bottom prior to adding the waxy corn starch and (2) to the top after adding the waxy corn starch. In the first test, the dyed starch moved from the bottom to the top, but only during the addition of the waxy corn starch. The dyed starch remained at the walls of the test rig and did not flow across the test plate. The DSF to the product bed was shut down, and the test plate was cleaned and setup to run with the second test. During this second test, undyed waxy corn starch was added to the test plate with the DSF flowing. The dyed waxy corn starch was dispersed evenly over the bed. Migration of the waxy corn starch through the dyed starch was not seen. The top of the product bed remained stationary, and stayed the same red intensity as when the dyed starch was added. The duration of the tests was 30 minutes each. It was also noticed there was no starch build up and the plate was cleaned without residuals.

Figure 3:
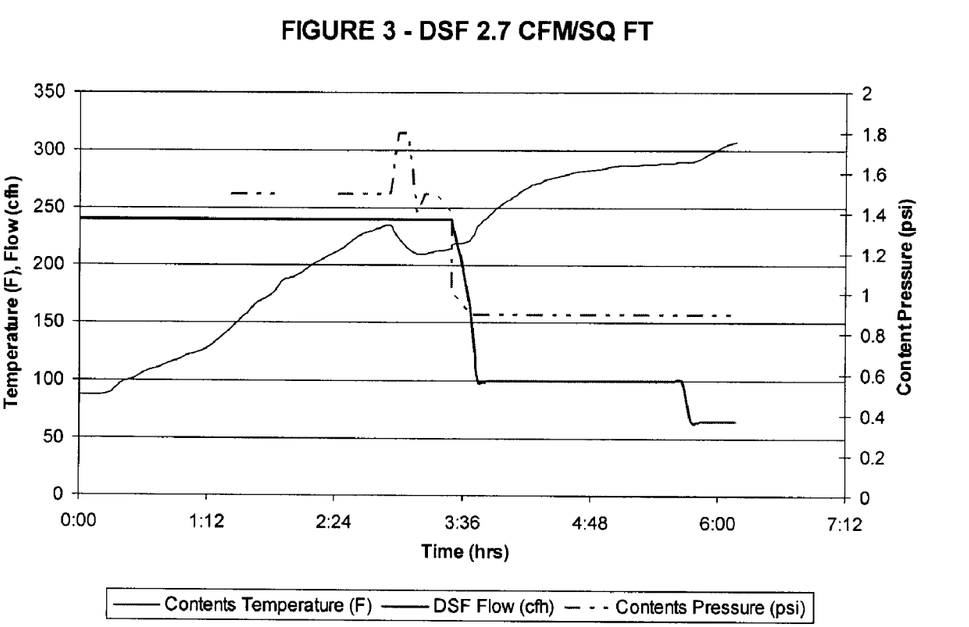
FIGS. 3-5 show charts related to trial runs carried out utilizing a fluid bed reactor proof of concept device of the type shown in FIG. 2.

Heated Trials were Carried Out as Follows:

A heated vessel was retrofitted to accept the test plate as shown in FIG. 2. This was done to determine if heating the DSF changed the operation of the poof of concept device, and its benefits. A heating unit for the DSF was not used for these experiments, but may be beneficial in additional trials. The vessel the test plate was installed in was heated. Waxy corn starch (4.4 lbs) was added to the test plate with DSF on prior to the addition of the waxy corn starch (the vessel was not heated at this point for safety reasons). The DSF used in this case was a mixture of nitrogen and compressed air. The liquid nitrogen was expanded to the gaseous state and contained less than 20 ppm oxygen and less than 18 ppm water from the assay supplied from the vendor. The compressed air was dried using a refrigerated drier followed by a desiccant drier. The mixture used for the experiment was 62.5% nitrogen and 37.5% air by volume. The vessel was closed and heated. Data from two of the runs is below:

Example 4a: As seen in the chart of FIG. 3—The content pressure was about 1.5 psi during the heating and drying. The heating took about 6 hours for temperature to get to 300F. Moisture of the waxy corn starch decreased from 9.5% to 0.04%.

Figure 4:
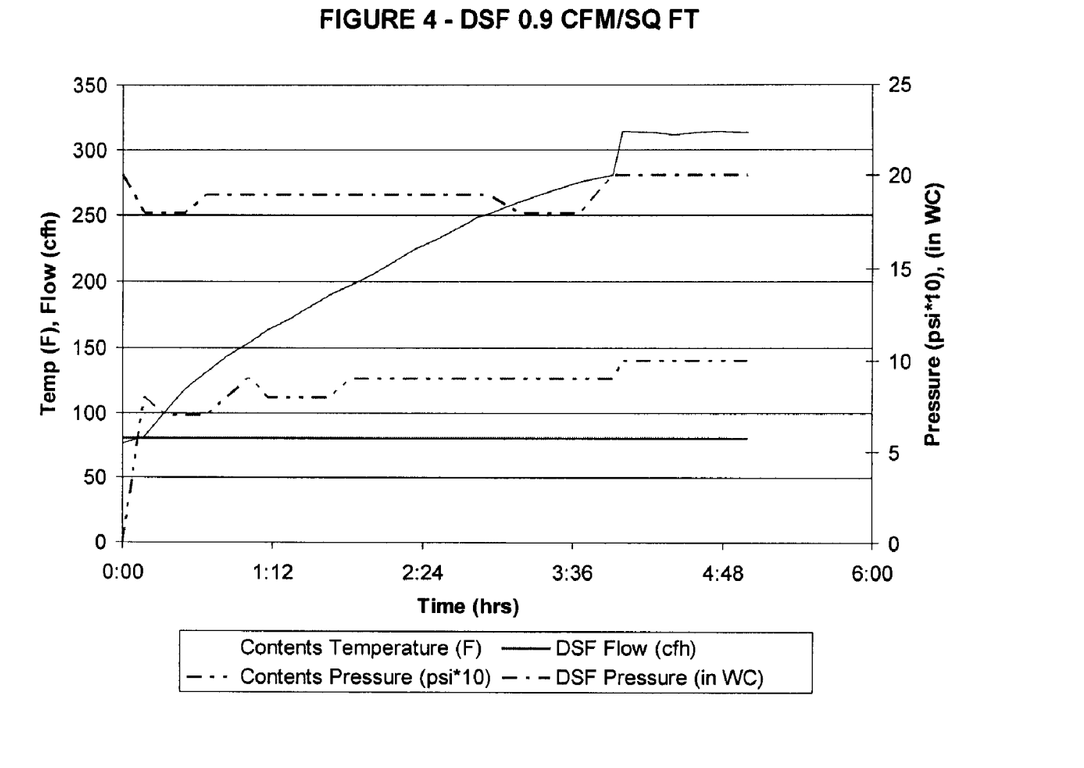

Example 4b: As seen in the chart of FIG. 4—Contents pressure less than 1 psi during heating and drying. It took about 4 hours for temperature to get to 300F. Moisture of the waxy corn starch decreased from 9.5% to 0.5%.

Figure 5:
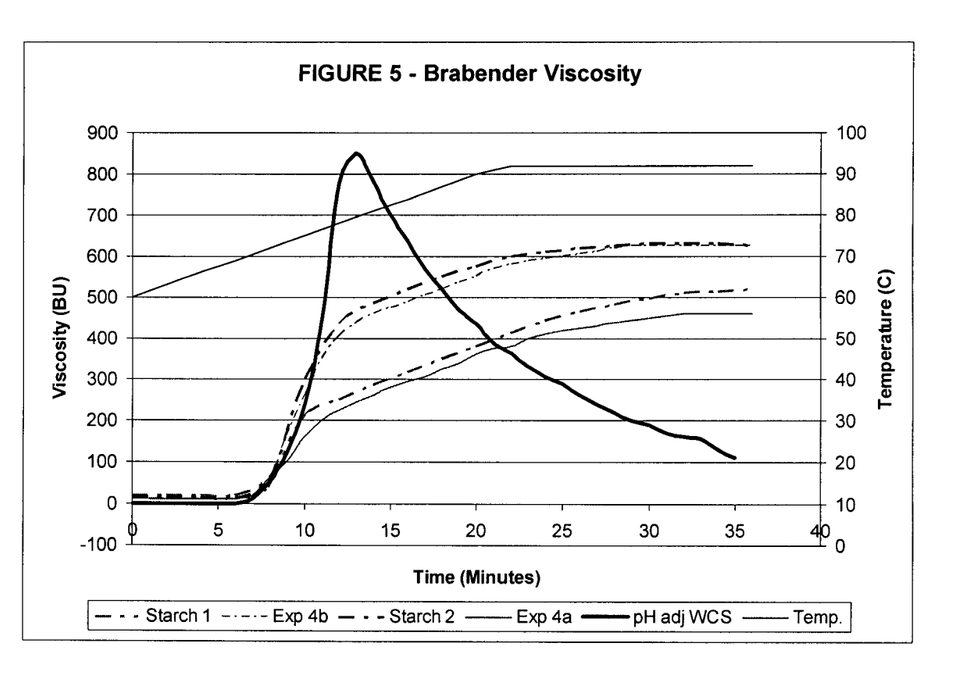

Brabender curves for 0.9 and 2.7 cfm/sq ft DSF flow (FIGS. 4 and 3, respectively) indicate properties of inhibited starches. The chart of FIG. 5 shows the level of inhibition compared to commercial starches, that is, the chart of FIG. 5 relates to Brabender viscosity curves for 0.9 and 2.7 cfm/sq ft DSF flow and commercial thermally inhibited starches produced by a commercial fluid bed reactor method. The products produced in the proof of concept device clearly indicate thermally inhibited products from the viscosity profiles. The starch with higher flow held for longer time indicates a more inhibited product, which would be expected based on experience with the commercial fluid bed reactor process.

Of note, various embodiments of the present invention may be used for processing starch, dextrins and/or converted starches.

In another example, the present invention may be used in any desired starch process, including: dextrinization; starch drying; heat moisture treatment; preparation of soluble starch; or dry chemical modifications to starch (i.e. cross-linking and substitution).

In another example, the present invention may be used in connection with the following processes: agglomerating, baking, blanching, calcinating, conditioning, cooling (e.g., evaporative), deactivating enzymes, dedusting, drying, fermenting, freeze drying, inert gas drying, pasteurizing, puffing, reacting, roasting, steam stripping, sterilizing, and/or any combination thereof.

In another example, the present invention may be used in the food industry, dairy industry, nutraceuaticals industry, and/or any combination thereof.

In another example, the present invention may be used in the food industry, dairy industry and/or nutraceuaticals industry in connection with derivatives, supplements, ingredients, end products, and/or any combination thereof.

In another example, the present invention may be used in connection with the following products: beta carotene, breadcrumbs, calcium gluconate, cereals, cheese, coca beans, coffee, crumb, dextrose, GDL, grains, herbs and spices, KGA, lactitol, sorbitol, xylitol, lactose, licorice extrudate, lycopens, meat, nuts/peanuts, potato flakes, powdered milk, PUFA, rice, salt, sausage farce (rusk), seeds, soya, sugar, tea, tobacco, tomato pulp, vitamin A, vitamin C, and/or any combination thereof.

In another example, the present invention may be used in connection with biomass processing, animal feed processing, inorganic waste processing, and/or any combination thereof.

In another example, the present invention may be used in connection with the following products: blood meal, citrus peel, compost, domestic waste, fish feed, fish meal, manure, paper waste, potato residue, return brood, slaughter waste, sludge, wood, and/or any combination thereof.

In another example, the present invention may be used in connection with bioplastics processing.

In another example, the present invention may be used in connection with mineral processing.

In another example, the present invention may be used in connection with the following products: aggregates, blast furnace slag, calcium carbonate, calumite, china clay, copper slag, ferrous metals, gypsum, iron slag, limestone, marble sand, non-ferrous metals, rock salt, sand, kaolin, and/or any combination thereof.

In another example, the present invention may be used in connection with chemical processing.

In another example, the present invention may be used in connection with the following products: ammonium sulphate, butyle rubber, calcium chloride, carboxyl methyl cellulose, chemicals, chomic acid, detergent powder, fertilizer, flame retardant, herbicides, hexamine, pena erythritol, pesticides, plastic granulate, polymers, potassium chloride, potassium sulphate, rubber pellets, salts, silica gel, sodium sulphate, twaron (Kevlar) pulp, vanadium oxide, Zn Pb granulate, aramide, and/or any combination thereof.

Of note, any embodiments described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods may have been described herein as being "computer implementable". In this regard it is noted that while such methods can be implemented using a computer, the methods do not necessarily have to be implemented using a computer. Also, to the extent that such methods are implemented using a computer, not every step must necessarily be implemented using a computer. Further, the housing may be heated, but need not necessarily be heated. Further, any heating may be carried out via conduction, convection and/or a combination thereof. Further still, any steps may be carried out in any desired order (and any desired steps may be added and/or any desired steps may be eliminated).

What is claimed is:

1. A fluid bed reactor, comprising:
   a housing;
   a plurality of trays disposed within the housing;
   at least one motor operatively connected to the plurality of trays, wherein the motor rotates the plurality of trays;
   at least one wiper associated with the plurality of trays which directs product on a top surface of a respective tray down through at least one radial slot in each respective tray as each respective tray is rotated by the motor; and
   at least one fan configured to supply a gas to the plurality of trays;
   wherein each tray of the plurality of trays at least partially comprises a perforated material;
   wherein each tray of the plurality of trays is supplied the gas individually via a coupling from the at least one fan such that the gas is permitted by the perforated material to flow up out of the top surface of the tray; and
   wherein the flow of the gas out of the top surface of each tray of the plurality of trays at least partially fluidizes product on the top surface of each tray.

2. The fluid bed reactor of claim 1, wherein the trays spaced vertically apart from one another.

3. The fluid bed reactor of claim 1, wherein the perforated material is sized to essentially prohibit product from passing through the perforations.

4. The fluid bed reactor of claim 3, wherein a size of the perforations is the same for each of the plurality of trays.

5. The fluid bed reactor of claim 3, wherein a size of the perforations is different for at least two of the plurality of trays.

6. The fluid bed reactor of claim 1, wherein the gas comprises air, dried gas, oxygen-enriched air, nitrogen, another inert gas, steam, superheated steam, and/or any combination thereof.

7. The fluid bed reactor of claim 1, wherein the gas is caused to flow up out of the top surface of the tray by the fan.

8. The fluid bed reactor of claim 1, further comprising at least one heater, wherein the heater heats at least the housing.

9. The fluid bed reactor of claim 1, further comprising at least one heater, wherein the heater heats at least some of the gas flowing up out of the top surface of the tray.

10. The fluid bed reactor of claim 1, wherein the plurality of trays are spaced vertically apart from one another along a common axis of rotation.

11. The fluid bed reactor of claim 1, wherein a vertical spacing between each of the plurality of trays is the same for each of the plurality of trays.

12. The fluid bed reactor of claim 1, wherein a vertical spacing between each of the plurality of trays is different for at least two of the plurality of trays.

13. The fluid bed reactor of claim 1, wherein each of the plurality of trays is essentially circular.

14. The fluid bed reactor of claim 1, wherein the top surface of each of the plurality of trays is essentially planar.

15. The fluid bed reactor of claim 1, wherein a speed of rotation of each of the plurality of trays is the same.

16. The fluid bed reactor of claim 1, wherein each of the plurality of trays has a single radial slot.

17. The fluid bed reactor of claim 1, wherein each of the plurality of trays has a plurality of radial slots.

18. The fluid bed reactor of claim 17, wherein a spacing between the plurality of radial slots on each of the plurality of trays is the same.

19. The fluid bed reactor of claim 17, wherein a spacing between the plurality of radial slots is different for at least two of the plurality of trays.

20. The fluid bed reactor of claim 1, further comprising a plurality of levelers, wherein each of the plurality of levelers is associated with one of the plurality of trays, and wherein each of the plurality of levelers maintains product on a top surface of a respective tray at a predetermined level.

21. The fluid bed reactor of claim 20, wherein the predetermined level is the same for each of the plurality of levelers.

22. The fluid bed reactor of claim 20, wherein the predetermined level is different for at least two of the plurality of levelers.

23. The fluid bed reactor of claim 1, wherein each of the plurality of trays is disposed entirely within the housing.

* * * * *